United States Patent
Xiao et al.

(10) Patent No.: US 10,012,856 B2
(45) Date of Patent: Jul. 3, 2018

(54) DISPLAY MOTHERBOARD, DISPLAY PANEL AND MANUFACTURING METHOD THEREOF, AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Wenjun Xiao, Beijing (CN); Xiaochuan Chen, Beijing (CN); Shijun Wang, Beijing (CN); Lei Wang, Beijing (CN); Wenbo Jiang, Beijing (CN); Yanna Xue, Beijing (CN); Yue Li, Beijing (CN); Zhiying Bao, Beijing (CN); Zhenhua Lv, Beijing (CN); Yong Zhang, Beijing (CN); Chunlei Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 195 days.

(21) Appl. No.: 14/742,605

(22) Filed: Jun. 17, 2015

(65) Prior Publication Data

US 2016/0266435 A1 Sep. 15, 2016

(30) Foreign Application Priority Data

Mar. 9, 2015 (CN) .......................... 2015 1 0103673

(51) Int. Cl.
*G02F 1/1333* (2006.01)
*G02F 1/1339* (2006.01)

(52) U.S. Cl.
CPC ...... *G02F 1/133351* (2013.01); *G02F 1/1339* (2013.01); *G02F 1/13394* (2013.01)

(58) Field of Classification Search
CPC ............. G02F 1/133351; G02F 1/1339; G02F 1/13394; G02F 1/1303; G02F 1/0107;
(Continued)

(56) References Cited

U.S. PATENT DOCUMENTS 7,982,845 B2 * 7/2011 Tsuchiya ............... G02F 1/1339
349/149
2003/0219922 A1 * 11/2003 Liu ..................... H01L 21/6838
438/67

(Continued)

FOREIGN PATENT DOCUMENTS

CN 102540580 A 7/2012
CN 104216176 A 12/2014
(Continued)

OTHER PUBLICATIONS

Office Action in Chinese Application No. 201510103673.4 dated Jan. 16, 2017, with English translation. 8 pages.

*Primary Examiner* — Edward Glick
*Assistant Examiner* — Shan Liu
(74) *Attorney, Agent, or Firm* — Womble Bond Dickinson (US) LLP

(57) ABSTRACT

The present disclosure describes a display Q_panel, a display panel and a manufacturing method thereof, as well as a display apparatus. The display Q_panel comprises a first and a second substrate for cell assembling to pre-form a plurality of display panels. The display Q_panel is provided, between the first substrate and the second substrate, with a blocking wall at the edge region on at least one side thereof, the blocking wall being located externally to the outmost cutting line on that side where it is located, and the sealant on that side being provided internally to the blocking wall.

(Continued)

By providing a blocking wall externally to the outmost cutting line on the display Q_panel, the blocking wall blocks the spill-out of the sealant on that side, reduces the undesirable phenomena of sealant puncture, sealant break, etc. arising from the display panels after the cutting, can respond better to the Peel-off, Bending or other tests, and improves the robustness of glass cell assembling.

4 Claims, 3 Drawing Sheets

(58) Field of Classification Search
CPC .... G02F 1/1341; G02F 1/161; G02F 1/13392; G02F 1/133377; G02F 2001/13396; G02F 2001/13398; H01L 27/3246
USPC .......................... 349/187, 153, 154, 155–157
See application file for complete search history.

(56) References Cited

U.S. PATENT DOCUMENTS

| | | | | |
|---|---|---|---|---|
| 2006/0215104 A1* | 9/2006 | Jung | ............... | G02F 1/1341 349/153 |
| 2007/0085965 A1* | 4/2007 | Manabe | ............... | G02F 1/1339 349/155 |
| 2010/0326592 A1* | 12/2010 | Ishitani | ............... | G02F 1/1341 156/250 |
| 2011/0122633 A1* | 5/2011 | Han | ............... | H01L 51/5246 362/382 |
| 2011/0279767 A1* | 11/2011 | Yamagishi | ............... | G02F 1/133351 349/190 |
| 2011/0297645 A1* | 12/2011 | Miyata | ............... | B32B 37/1018 216/23 |
| 2012/0133874 A1* | 5/2012 | Hoshina | ............... | G02F 1/1339 349/138 |
| 2013/0335686 A1* | 12/2013 | Chen | ............... | G02F 1/1335 349/106 |
| 2014/0167004 A1* | 6/2014 | Jeong | ............... | H01L 51/5246 257/40 |
| 2014/0293212 A1* | 10/2014 | Osaki | ............... | G02F 1/133351 349/153 |
| 2016/0018682 A1* | 1/2016 | Kim | ............... | G02F 1/1339 349/58 |

FOREIGN PATENT DOCUMENTS

| | | |
|---|---|---|
| CN | 104330912 A | 2/2015 |
| JP | H11119230 A | 4/1999 |

* cited by examiner

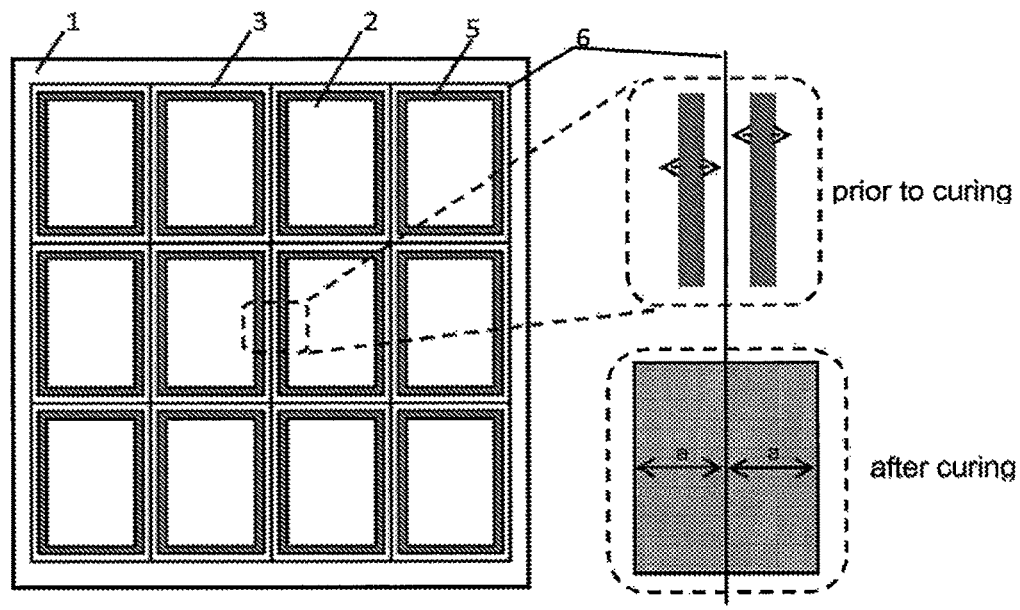
FIG.1  - - Prior Art - -
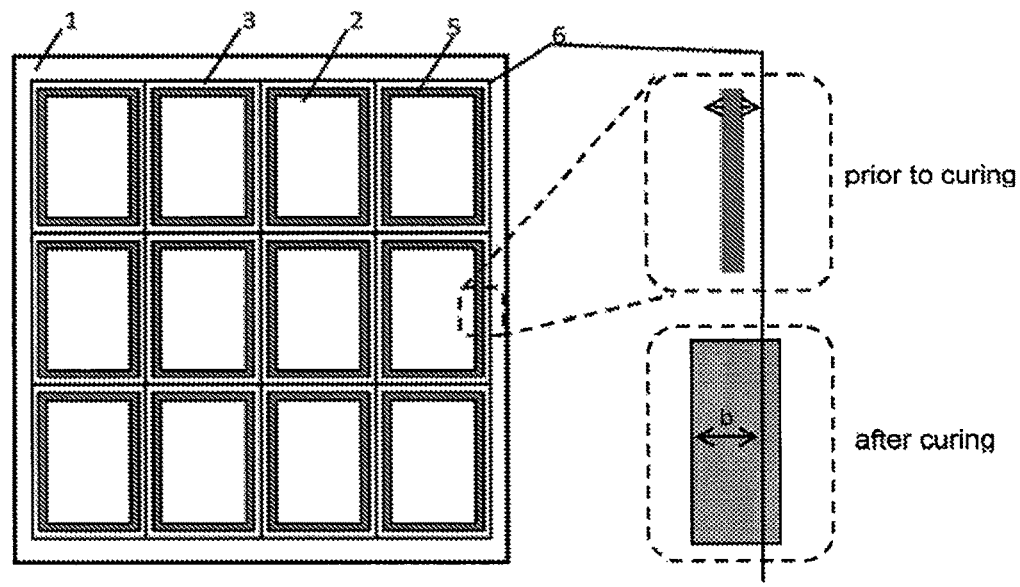
FIG.2  - - Prior Art - -

-- Prior Art --    -- Prior Art --    -- Prior Art --

DISPLAY MOTHERBOARD, DISPLAY PANEL AND MANUFACTURING METHOD THEREOF, AND DISPLAY APPARATUS

RELATED APPLICATIONS

The present application claims the benefit of Chinese Patent Application No. 201510103673.4, filed Mar. 9, 2015, the entire disclosure of which is incorporated herein by reference.

TECHNICAL FIELD

The present disclosure relates to the field of display technology, and specifically to a display motherboard, a display panel and a manufacturing method thereof, as well as a display apparatus.

BACKGROUND ART

The Liquid Crystal Displays (LCD) enjoy a number of advantages such as being light and slim, compact and small, and low in power consumption and heat generation, and so on. These advantages have caused LCDs to emerge from various types of display apparatuses and be widely used in modernized information equipment including TV sets, computers, tablet PCs, mobile phones, etc.

Currently, with constant growth of the flat-panel display technology, consumers are driven gradually to switch their attentions to the appearances and the diversified functions of flat-panel displays. Consequently, the flat-panel displays with a narrow border design have come into common existence. A flat-panel display with the narrow border design can have its volume downsized to a maximum limit, while the area of one's visibility that he or she feels can be effectively widened. Therefore, such narrow border design is rightly the trend and direction of development for future flat-panel displays.

Generally, a display motherboard comprises a plurality of display panels, with the edges of each display panel being sealed with a sealant, and the edges of the display motherboard being sealed with the sealant as well. As the liquid crystal display panel border gets increasingly narrower, the cutting of the display panels starts to be made in the manner of cutting with sealant. Upon using this method, since the sealant at the edges of a display panel is not blocked by the sealant for an adjacent display panel, the sealant at the edges of the display motherboard would spill from the display panels in considerable amount when the sealant is fittingly pressed and cured, such that the width of reserved sealant within the display panels after the curing becomes smaller, and accordingly, many undesirable phenomena arise from the display panels after the cutting with sealant, like sealant puncture, sealant break and so on, which could not be approved during such tests as Peel-off, Bending, etc.

SUMMARY OF THE INVENTION

In respect of the drawbacks in the prior art, the present disclosure provides a display motherboard, a display panel and a manufacturing method thereof, as well as a display apparatus, thereby avoiding the undesirable issues such as sealant puncture, sealant break, etc. arising from the display panels after the cutting with sealant.

In a first aspect according to the present disclosure, a display motherboard is provided, the display motherboard comprising a first and a second substrate for cell assembling to pre-form a plurality of display panels, said display motherboard being provided, between said first substrate and said second substrate, with a blocking wall at the edge region on at least one side thereof, said blocking wall being located externally to the outmost cutting line on that side where it is located, and the sealant on that side being provided internally to said blocking wall, said blocking wall being used for blocking the spill-out of the sealant on that side.

Optionally, said blocking wall is provided on opposite two sides of said display motherboard, said opposite two sides being those of said display motherboard predetermined for a cutting with sealant.

Optionally, said blocking wall is parallel with the outmost cutting line on that side.

Optionally, said blocking wall is formed with intervals at positions correspondingly between two display panels.

Optionally, a distance from said blocking wall to the outmost cutting line on that side is 0.08 mm to 0.12 mm.

Optionally, said blocking wall is made of a photo spacer material.

Optionally, said blocking wall is at a same height with a main photo spacer or with a subordinate photo spacer.

In a second aspect according to the present disclosure, a display panel is also provided, said display panel being formed by cutting said display motherboard.

In a third aspect according to the present disclosure, a display apparatus is also provided, comprising said display panel according to the above.

In a fourth aspect according to the present disclosure, a display panel manufacturing method is also provided, comprising:

providing pre-cutting lines on a first substrate, and providing a blocking wall at the edge region on at least one side of said first plate;

applying a coating of sealant on said first plate, and for the edge region provided with the blocking wall, said sealant being provided internally to said blocking wall, said blocking wall being used for blocking the spill-out of the sealant on that side where it is located;

cell-assembling said first substrate and a second plate to form a display motherboard;

cutting said display motherboard into a plurality of display panels along said cutting lines.

It can be clear from the above technical solution that the display motherboard, the display panel and the manufacturing method thereof, as well as the display apparatus provided by the present disclosure provide a blocking wall externally to the outmost cutting line on the display motherboard, the blocking wall blocks the spill-out of the sealant on that side where it is located, guarantees a width of reserved sealant internally to the outmost cutting line after the curing, reduces the undesirable phenomena of sealant puncture, sealant break, etc. arising from the display panels after the cutting, can respond better to the Peel-off, Bending or other tests, and improves the robustness of glass cell assembling.

DESCRIPTION OF THE DRAWINGS

FIG. 1 is a schematic diagram of the sealant, prior to and after being cured, for adjacent display panels in a display motherboard according to the prior art;

FIG. 2 is a schematic diagram of the sealant, prior to and after being cured, at the periphery of a display motherboard according to the prior art;

Figure 3:
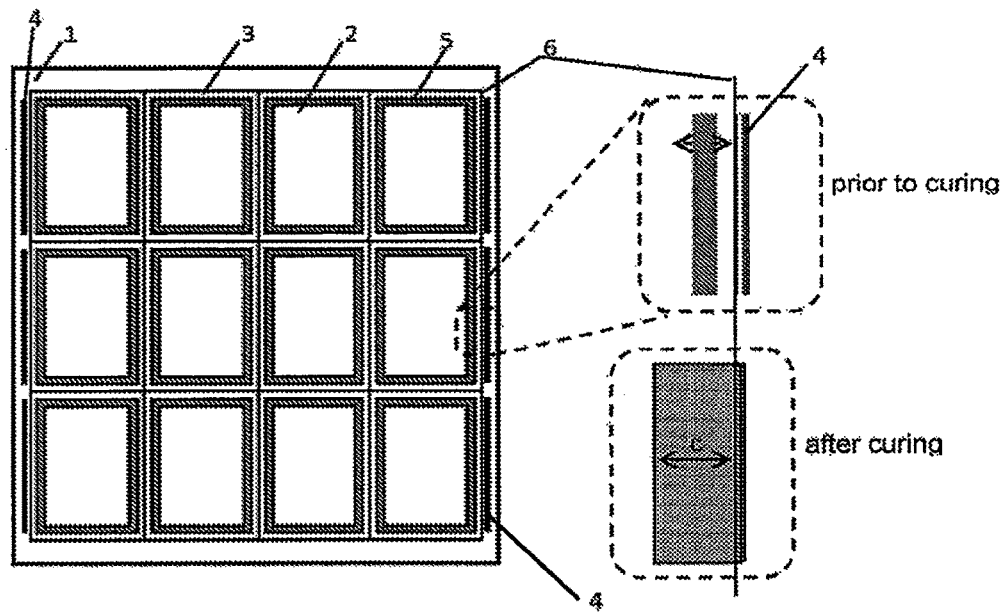
FIG. 3 is a schematic diagram of the structure of a display panel provided by an embodiment of the present disclosure as well as a schematic diagram of the sealant, prior to and after being cured, at the periphery of a display motherboard.

in which the reference signs are presented as follows:

1. substrate; 2. display panel; 3. display motherboard; 4. blocking wall; 5. sealant; 6. cutting line.

EMBODIMENTS OF THE INVENTION

The implementation of the present disclosure will be further illustrated below in conjunction with the accompanying drawings. The embodiments below are used only for making clearer illustration of the technical solution of the present disclosure rather than for limiting the scope of the present disclosure.

When the panel cutting in a liquid crystal display panel adopts cutting with sealant, a coating of an uncured sealant 5 is applied around the display panel 2, and then cell assembling is performed between an upper and a lower substrate 1. During the cell assembling, the sealant would be extruded to scatter sideways. FIG. 1 shows a schematic diagram of the sealant, prior to and after being cured, for adjacent display panels in a display motherboard 3 according to the prior art. As shown in FIG. 1, for the display panels located intermediately on the display motherboard 3, the sealant 5 in the adjacent display panels would function as a block to each other when it spills out, and the sealant would scatter more to the inside of the display panels, such that the sealant ends up with covering the cutting line 6 evenly. Hereto, the width of sealant reserved internally to the display panel is a.

FIG. 2 shows a schematic diagram of the sealant, prior to and after being cured, at the periphery of a display motherboard according to the prior art. As shown in FIG. 2, taking one of the right-most column of display panels on the display motherboard 3 for example, because this display panel does not have, on the right side, the block from the sealant 5 for an adjacent display panel, the sealant on the right side of this display panel would scatter evenly to the inside and the outside of the display panel when the sealant is fittingly pressed and cured, where the sealant that spills over the display panel augments, such that the width of reserved sealant internally to the cutting line 6 of the display panel after being cured becomes smaller (the sealant width is b as shown in FIG. 2). An overly small size of the sealant width would result in many undesirable legacies. Likewise, at the left-most, the up-most and the down-most columns of display panels, the sealant on the left side of, above and below the respective column would have the same legacies.

In the case of cutting with sealant, many undesirable phenomena concerning the sealant would occur on the products during the courses of production, including sealant puncture, sealant break, etc. Further, such products could not be approved in such tests as Peel-off, Bending, etc. It has been found through analysis that such undesirability resides mainly in opposite two sides of the display motherboard which undergo the cutting with sealant. The sealant within these display panels spills out in excessive amount while the sealant reserved internally to the display panels gets enormously narrow, thus resulting in the above-said undesirability.

An overly small-sized sealant width reserved internally to the cutting line (as a result of the excessive spill-out of the cured sealant at the outmost side of the display motherboard) can cause the undesirable phenomena of sealant puncture, sealant break, etc. on the cut display panels and lead to failure of approval in such tests as Peel-off, Bending, etc. The embodiments of the present disclosure could solve the above problems, guarantee a width of cured sealant within the display panels, avoid the occurrences of undesirability such as sealant puncture, sealant break, etc., and improve the robustness of glass cell assembling in the case of a cutting with sealant.

FIG. 3 shows a schematic diagram of the structure of a display panel provided by an embodiment of the present disclosure as well as a schematic diagram of the sealant, prior to and after being cured, at the periphery of a display motherboard. As shown in FIG. 3, the display motherboard 3 comprises a first and a second substrate 1 for cell assembling to pre-form a plurality of display panels. The display motherboard is provided, between said first substrate and said second substrate, with a blocking wall 4 at the edge region on at least one side thereof. The blocking wall is located externally to the outmost cutting line 6 on that side where it is located, and the sealant 5 on that side is provided internally to the blocking wall. The blocking wall is used for blocking the spill-out of the sealant on that side.

The above-said edge region is the region between the outmost cutting line of the display motherboard and the lateral border line on that side.

By blocking the spill-out of the sealant via the blocking wall on that side, a width of cured sealant reserved internally to the outmost cutting line on that side is guaranteed, where the width of cured sealant reserved internally to the outmost cutting line on that side can be set according to practical circumstances. If the uncured sealant width is 0.25 mm, and the cured sealant width is 0.65 mm, the width of cured sealant reserved internally to the outmost cutting line on that side is 0.55 mm, as shown in FIG. 3. That is, the sealant width c within the cutting line is guaranteed to be above 0.55 mm.

This embodiment is used only as an example for illustration, while in different applications, the width of cured sealant reserved internally to the outmost cutting line on that side can be set, according to which a distance from the blocking wall to the cutting line can thus be determined, and the blocking wall is then provided at a corresponding position based on the distance. The embodiment sets no limit on the width of the cured sealant reserved internally to the outmost cutting line on that side.

The above-said display motherboard is provided with a blocking wall externally to the outmost cutting line, which blocks the spill-out of the sealant on that side where it is located, guarantees a width of reserved sealant internally to the outmost cutting line after the curing, reduces the undesirable phenomena of sealant puncture, sealant break, etc. arising from the display panels after the cutting, can respond better to the Peel-off, Bending or other tests, and improves the robustness of glass cell assembling.

The above-said first and second substrate can also be understood as an upper and a lower substrate. In order to give a clear picture of the position of the blocking wall between the two substrates, the substrate in FIG. 3 can be understood as an upper substrate or a lower substrate.

In order to provide consistency and evenness about the sealant width within each display panel after the cutting, the blocking wall is in parallel with the outmost cutting line on that side. In this way, the providing of the blocking wall can be more operable, and additionally, in order to facilitate the cutting with sealant and to prevent the blocking wall from causing difficulty to the cutting, the blocking wall is designed in segments such that correspondingly at positions between two display panels, there are intervals formed between adjacent blocking walls.

In this embodiment, in order to make the width of cured sealant reserved internally to the outmost cutting line on that side larger than or equal to 0.55 mm, i.e. the width of reserved sealant internally to the cutting line after the curing larger than or equal to 0.55 mm, the distance from the blocking wall to the outmost cutting line on that side is 0.08 mm to 0.12 mm.

The above-said blocking wall is made of a photo spacer material (PS), wherein the blocking wall is at the same height with a main PS or with a subordinate PS (Sub PS). Since it is manufactured by using a ready-made material and is at the same height with the photo spacer, it would not affect the cell assembling.

In a feasible implementation, the blocking wall is provided on opposite two sides of the display motherboard, which are the opposite two sides of the display motherboard predetermined for a cutting with sealant. Since the opposite two sides are designed for cutting with sealant, the cell assembling process of an upper and a lower substrate would result in the phenomenon of excessive spill-out of the sealant. On the contrary, at the lateral border line of the display motherboard without the need of the cutting with sealant, no excessive spill-out of the sealant would occur, and accordingly, it would be unnecessary to provide a blocking wall for blocking sealant spill-out. In specific applications, the blocking wall can also be located at either side of the opposite two sides. This embodiment sets no limit on the specific position where it is provided, which instead can be set according to requirements of the manufacture.

FIG. 3 shows an example where two outmost columns of display panels on the display motherboard are both provided with PS blocking walls, where after cell assembling the upper and the lower substrate, the sealant is extruded to scatter sideways, and encounters the blocking walls when scattering sideways of the display panels, which play a blocking role. The sealant then no longer spills out and instead scatters more to the inside of the display panels, thereby ensuring a width c of the sealant within the display panels after the curing (c is only slightly smaller than a), hence avoiding the occurrence of the aforesaid undesirability and improving the robustness of glass cell assembling in the case of a cutting with sealant.

Figures 4A, 4B, 4C, 4D:
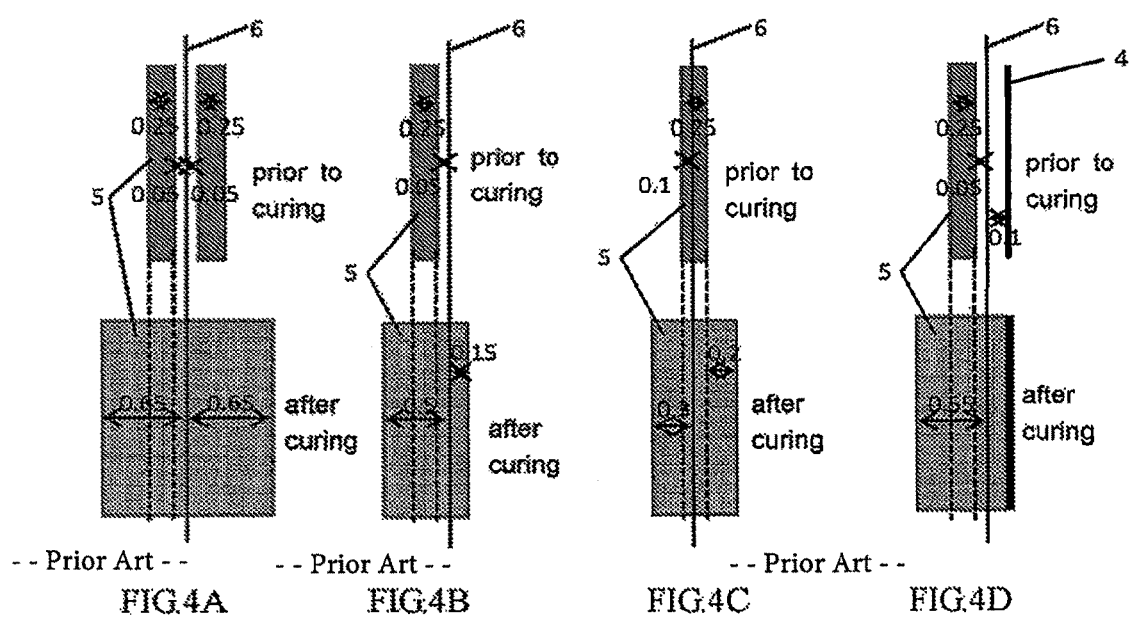
FIGS. 4A-4C are schematic diagrams of the sealant, prior to and after being cured, for adjacent display panels and at the periphery of a display motherboard in the prior art.
FIG. 4D is a schematic diagram of the sealant, prior to and after being cured, at the periphery of the display motherboard provided by another embodiment of the present disclosure.

FIGS. 4A-4C are schematic diagrams of the sealant, prior to and after being cured, for adjacent display panels and at the periphery of a display motherboard in the prior art.

Hereinafter the condition that a width of the wet gel applied for the coating of sealant is 0.25 mm, a distance from the sealant to the cutting line is 0.05 mm, and a required width of the cured sealant is 0.65 mm, is taken as an example to illustrate the width of sealant reserved internally to the cutting line prior to and after the curing under various circumstances.

In FIG. 4A is shown the scattering of the sealant between two display panels located intermediately on the Q_ panel when it is fittingly pressed. The ultimate sealant width a within the display panels (i.e. internally to the cutting line) is equal to 0.65 mm.

In FIG. 4B is shown the scattering of the sealant for the right-most column of display panels on the display motherboard when it is fittingly pressed. Since there is no adjacent sealant to provide a block on the right side, the sealant would scatter sideways, 0.2 mm for each side, when it is fittingly pressed, and the ultimate sealant width reserved within the display panels is only 0.5 mm, which is about 23% less than the normal sealant width of 0.65 mm, so that the undesirable phenomena of sealant puncture, sealant break, etc. would likely occur and likeliness would be higher for a disapproval in such tests as Peel-off, Banding, etc. By then, if a further step is taken to consider a sealant width as precise as 0.2 mm for the coating, as shown in FIG. 4C, the wet gel applied for the sealant is, in a worst situation, 0.2 mm deviated to the right side while no adjacent sealant is on the right side to provide a block. The sealant would scatter sideways, 0.2 mm for each side, when it is fittingly pressed, and the ultimate sealant width reserved within the display panels is only 0.3 mm, which is about 54% less than the normal sealant width of 0.65 mm, so that the possibility for an undesirability occurrence further enlarges.

As shown in FIG. 4D, a PS blocking wall is provided at a position of 0.1 mm from the cutting line and externally to the outmost display panels on the display motherboard. When the sealant scatters as it is fittingly pressed, the sealant could not continue spilling out as it encounters the PS blocking wall. Thus, no matter how much the deviation of the location of the wet-gel applied for the sealant is, under blocking by the PS blocking wall, a width of more than 0.55 mm can ultimately be ensured for the sealant within the display panels, which is about 15% less than the normal sealant width of 0.65 mm, so that an undesirability resulted from an overly narrow sealant could be effectively avoided.

Figure 5:
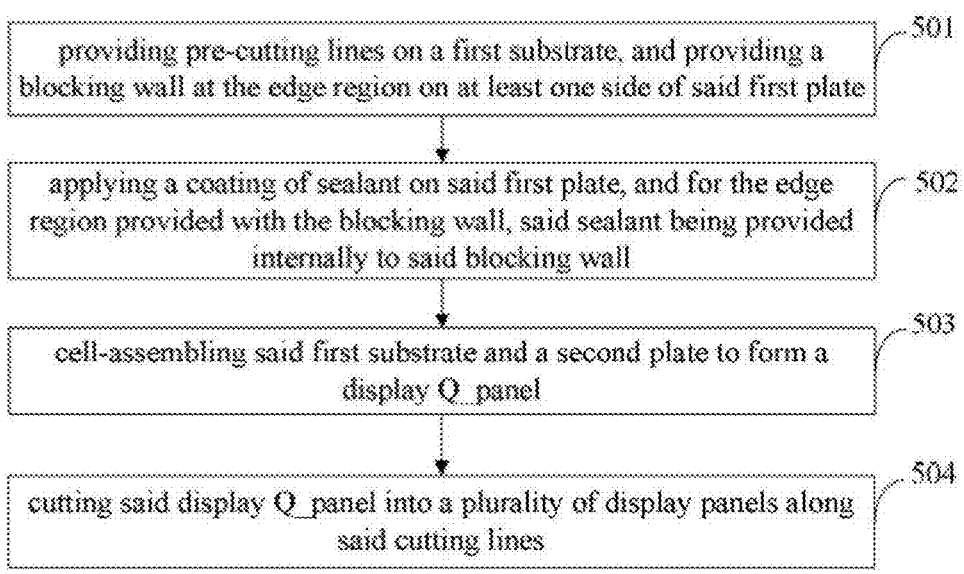
FIG. 5 is a schematic flow chart of a manufacturing method of a display panel provided by an embodiment of the present disclosure.

FIG. 5 shows a schematic flow chart of a manufacturing method of a display panel provided by an embodiment of the present disclosure. As shown in FIG. 5, the method comprises the steps of:

Step 501: providing pre-cutting lines on a first substrate, and providing a blocking wall at the edge region on at least one side of the first plate;

Step 502: applying a coating of sealant on said first plate, and for the edge region provided with the blocking wall, said sealant being provided internally to said blocking wall, said blocking wall being used for blocking the spill-out of the sealant on that side where it is located;

Step 503: cell-assembling said first substrate and a second plate to form a display motherboard;

Step 504: cutting said display motherboard into a plurality of display panels along said cutting lines.

An embodiment of the present disclosure provides also a display panel, which is formed by cutting the display motherboard in the above embodiment.

An embodiment of the present disclosure provides also a display apparatus comprising the display panel in the above embodiment.

For example, the display apparatus may be a TV set, a computer, a tablet PC, a mobile phone or any other device with a display function.

A great number of details have been described in the description of the present disclosure. However, it should be understood that the embodiments of the present disclosure can be practiced without these details. In some instances, details of the commonly known methods, structures and techniques are not shown in order not to confuse the understanding of the present description.

At last, it should be noted that each of the embodiments above is used only for illustration of the technical solution of the present disclosure rather than a limitation thereto. Although the present disclosure is illustrated in detail with reference to the aforesaid embodiments respectively, an ordinarily skilled in the art should understand that still modifications can be made to the technical solutions as described through the above embodiments, or equivalent substitutions can be involved for a part or an integrity of the technical features therein; whereas these modifications or substitutions will not make the essence of the corresponding technical solution depart from the scope of the technical solution of respective embodiment of the present disclosure, and should be included in the scope of the claims and the description of the present disclosure.

The invention claimed is:

1. A display motherboard comprising a first substrate and a second substrate for cell assembling to pre-form a plurality of display panels, wherein said display motherboard is provided, between said first substrate and said second substrate, with a blocking wall at an edge region on at least one side thereof, said blocking wall is located externally to an outmost cutting line on said at least one side where it is located, and a sealant on said at least one side is cured and located internally to said blocking wall, wherein said blocking wall is configured to block a spill-out of the sealant on said at least one side before the sealant is cured, and the cured sealant on said at least one side extends across the outmost cutting line and directly contacts a whole sidewall of said blocking wall, said blocking wall is parallel with the outmost cutting line with a distance from said blocking wall to the outmost cutting line being 0.08 mm to 0.12 mm, and a width of the cured sealant reserved internally to the outmost cutting line on said at least one side is equal to or more than 0.55 mm.

2. The display motherboard according to claim 1, wherein said blocking wall is provided on opposite two sides of said display motherboard, said opposite two sides being those of said display motherboard predetermined for a cutting together with the sealant.

3. The display motherboard according to claim 1, wherein said blocking wall is formed with intervals at positions correspondingly between two display panels.

4. The display motherboard according to claim 1, wherein said blocking wall is made of a photo spacer material.

\* \* \* \* \*